United States Patent
Coates et al.

(10) Patent No.: US 6,807,947 B2
(45) Date of Patent: Oct. 26, 2004

(54) METHOD AND DEVICE FOR CONTROLLING FUEL METERING INTO AN INTERNAL COMBUSTION ENGINE

(75) Inventors: Derek Coates, Graben-Neudorf (DE); Lars Empacher, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 38 days.

(21) Appl. No.: 10/394,097

(22) Filed: Mar. 21, 2003

(65) Prior Publication Data

US 2003/0213473 A1 Nov. 20, 2003

(30) Foreign Application Priority Data

Mar. 21, 2002 (DE) .......................................... 102 12 508

(51) Int. Cl.$^7$ .............................................. F02M 51/00
(52) U.S. Cl. ..................... 123/490; 73/861.44
(58) Field of Search ........................ 123/490; 73/861.44

(56) References Cited

U.S. PATENT DOCUMENTS 3,593,576 A * 7/1971 Greer ........................ 73/861.44
5,277,163 A * 1/1994 Ohishi ........................ 123/490
6,679,222 B1 * 1/2004 Reischl et al. .............. 123/490

FOREIGN PATENT DOCUMENTS

EP 840 003 5/1998

* cited by examiner

*Primary Examiner*—Erick Solis
(74) *Attorney, Agent, or Firm*—Kenyon & Kenyon

(57) ABSTRACT

A device and a method for determining a fuel pressure and/or an injected amount of fuel are described. A fuel injection unit meters the fuel to an internal combustion engine as a function of a first and a second trigger signal. The first trigger signal controls the start and end of fuel metering, and the second trigger signal controls the pressure buildup. The variation of pressure is determined on the basis of at least the first trigger signal and the second trigger signal.

12 Claims, 2 Drawing Sheets

METHOD AND DEVICE FOR CONTROLLING FUEL METERING INTO AN INTERNAL COMBUSTION ENGINE

FIELD OF THE INVENTION

The present invention relates to a method and a device for controlling fuel metering in an internal combustion engine.

BACKGROUND INFORMATION

In known pump-nozzle units, only one final controlling element is provided, in particular a solenoid valve or a piezoelectric actuator, which may be energized or de-energized. This corresponds to the two states "off" and "injection." More recent pump-nozzle systems have a third additional state, in which pressure is built up in the pump and is thus variably adjustable. In other words, the pressure at which injection starts is variably adjustable. This provides an additional free, continuous parameter, which has considerable influence on the injected amount.

Such fuel injection units contain a first final controlling element which receives a first trigger signal, which controls the start and end of fuel metering, and a second final controlling element which receives a second trigger signal, which controls the pressure that is available for fuel metering. Such a fuel injection unit is known from European Published Patent Application No. 840 003, for example.

SUMMARY OF THE INVENTION

According to the present invention, variation over time of the injection pressure and thus of the injected amount is controlled using a semi-empirical model on the basis of the first and second trigger signals using constants and relationships between the variables.

It is particularly advantageous the variation of pressure in a method and a device for determining a fuel pressure and/or an injected amount of fuel on the basis of at least a first trigger signal and a second trigger signal. This is particularly advantageous in the case of a fuel injection unit which meters fuel to an internal combustion engine as a function of a first and a second trigger signal, the first trigger signal controlling the start and the end of fuel metering and the second trigger signal controlling the pressure buildup.

It is particularly advantageous if variables which characterize the start of pressure buildup, the start of fuel metering and/or the end of fuel metering are predefinable on the basis of the first and second trigger signals. These variables essentially characterize the variation of fuel pressure over time.

In addition to the above-named variables, the rotational speed essentially determines the variation of pressure. This is the case in particular in pump-nozzle systems. Therefore, the rotational speed is very advantageously used additionally for determining the variation of pressure.

The injected amount of fuel is determined on the basis of the variation of pressure by integration in a simple manner.

It is particularly advantageous that the computed amount of fuel and/or the computed pressure is compared with predefined values, and a malfunction is detected on the basis of the comparison. This provides simple and effective monitoring of the injection device.

It is particularly advantageous and simple if the computed amount of fuel is compared with a desired amount of fuel, and a malfunction is detected on the basis of the comparison.

In using the model as a pressure estimator, the pressure and the injected fuel amount are continuously computed in the controller. The pressure signal or fuel amount signal thus obtained may then be used for malfunction monitoring and/or control of the injection. In particular, it may be provided that a malfunction is detected if the pressure exceeds a maximum pressure or the injected amount exceeds a maximum amount.

Furthermore, the model may be used as a calibration aid. The injected amount in these systems is essentially a function of the needle opening pressure in addition to the duration of injection. Thus, two parameters are established by the calibrator for setting the desired amount at a given rotational speed.

The formulas on which the model is based are invertible. This allows the calibrator to specify the variation of injection, i.e., amount, start of injection, and needle opening pressure. The injection sequence is computed from these variables.

Implementations in the form of a computer program having a program code and in the form of a computer program product having a program code are of particular significance. The computer program according to the present invention has a program code for executing all steps of the method according to the present invention when the program is executed on a computer, in particular a controller for an internal combustion engine. In this case, the present invention is implemented by a program stored in the controller, so that this controller provided with the program represents the present invention just as does the method for whose execution the program is suitable. The computer program product according to the present invention has a program code stored on a computer-readable data medium for executing the method according to the present invention when the program product is executed on a computer, in particular a controller for an internal combustion engine of a motor vehicle. In this case, the present invention is therefore implemented by a data medium, so that the method according to the present invention is executable if the program product, i.e., the data medium, is integrated in a controller for an internal combustion engine, in particular of a motor vehicle. An electrical storage medium such as a read-only memory (ROM), an EPROM, or a permanent electric memory such as a CD-ROM or DVD, may be used in particular as a data medium, i.e., as a computer program product.

DETAILED DESCRIPTION

Figure 1:
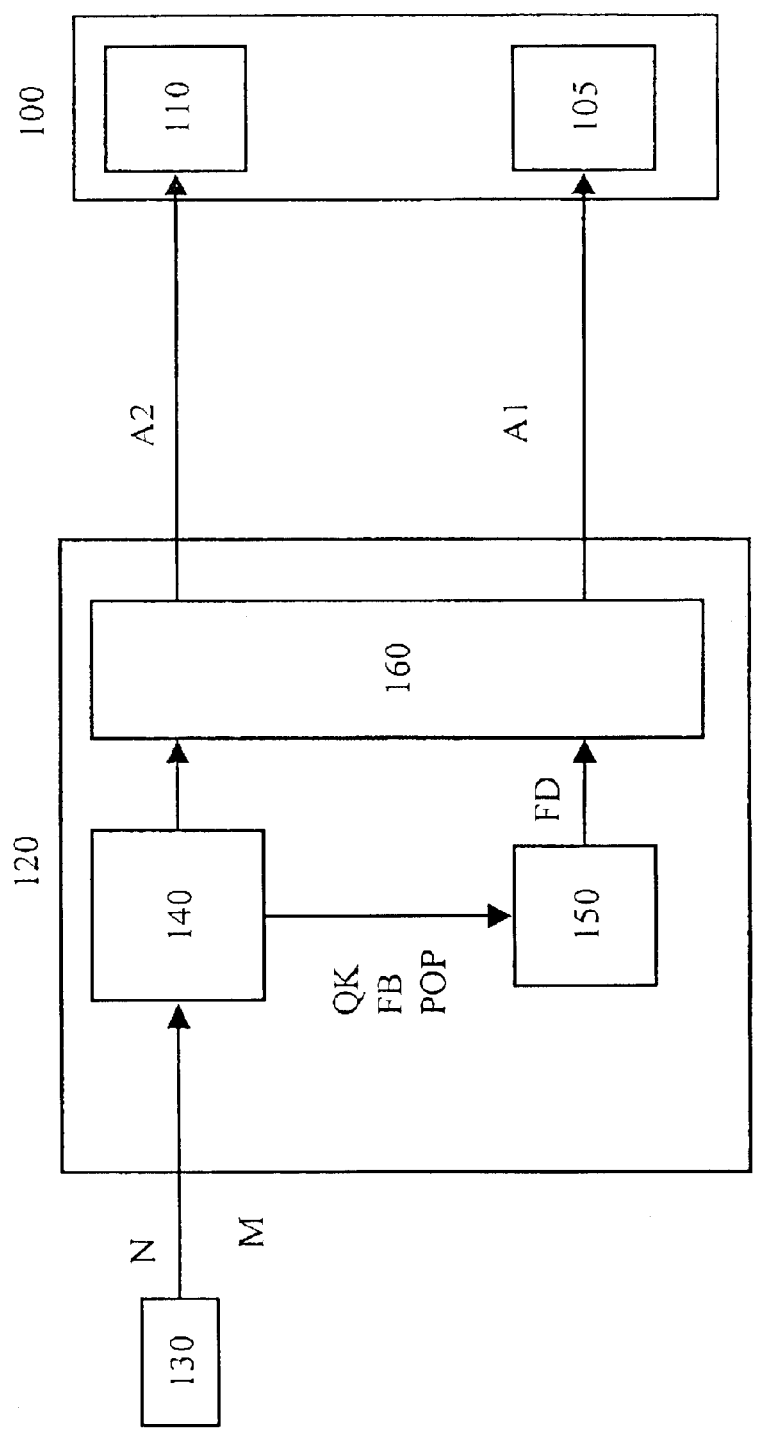
FIG. 1 shows a block diagram of the method according to the present invention.

FIG. 1 shows the device according to the present invention using a block diagram. A fuel injection unit 100 includes a first final controlling element 105 and a second final controlling element 110. The start of injection and the end of injection—and therefore the injected amount—are influenceable using the first final controlling element. The start and the end of the pressure buildup are influenceable using the second final controlling element. The mechanical structure of such a fuel injection unit is described in European Published Patent Application No. 840 003, for example. The fuel injection unit described there is normally referred to as a pump-nozzle unit.

A controller 120 supplies the fuel injection unit with trigger signals A1 for the first final controlling element and trigger signals A2 for the second final controlling element. For this purpose, controller 120 analyzes signals N of different sensors 130. The controller analyzes signal N of a rotational speed sensor and/or signal M of a pedal sensor and/or a torque request, among other things.

Controller 120 essentially includes a control unit 140, a pump characteristics map 150, and a trigger unit 160. Control unit 140 supplies pump characteristics map 150 with various signals, such as a signal QK which characterizes the desired amount of fuel to be injected, a signal FB, which characterizes the desired start of injection, and a signal POP, which characterizes the fuel pressure at the start of fuel injection. Pump characteristics map 150 converts these signals into a signal FD, which characterizes the duration of triggering and transmits to the trigger unit. Furthermore, control unit 140 directly supplies trigger unit 160 with signals which characterize the start of injection, the start and the end of pressure buildup. These signals are converted by trigger unit 160 into trigger signals A1 and A2 to be supplied to first and second final controlling elements, respectively.

A pump characteristics map 150, to which a signal regarding the injection start, i.e., start of fuel delivery, a rotational speed signal N, a signal QK which characterizes the amount of fuel to be injected, and a signal, which characterizes pressure POP prevailing in the high-pressure area of the fuel injection unit at the start of injection are supplied as input variables, is preferably used. The pump characteristics map provides the computed duration of fuel delivery FD as an output variable. This pressure-dependent pump characteristics map is then used for all partial injections.

Pressure POP, which prevails at the start of injection, may be modeled from other variables internally in controller 120 according to the method described in the following.

Control unit 140 defines various variables on the basis of various operating variables which are detected using sensors that are not illustrated. The variables defined by the control unit include desired amount of fuel QK to be injected, pressure POP at the start of fuel injection, start of fuel delivery FB, the start and the end of pressure buildup. These variables are defined for all partial injections when a plurality of partial injections takes place. Instead of the start of injection, an equivalent variable such as the start of fuel delivery may also be defined. These variables are converted by trigger unit 160 into trigger signals A1 and A2 to be supplied to first final controlling element 105 and second final controlling element 110.

In modeling the pressure and thus the amount of fuel, a distinction is made between essentially three time phases. These are the off position, i.e., no pressure buildup, pressure buildup, and injection.

Figure 2:
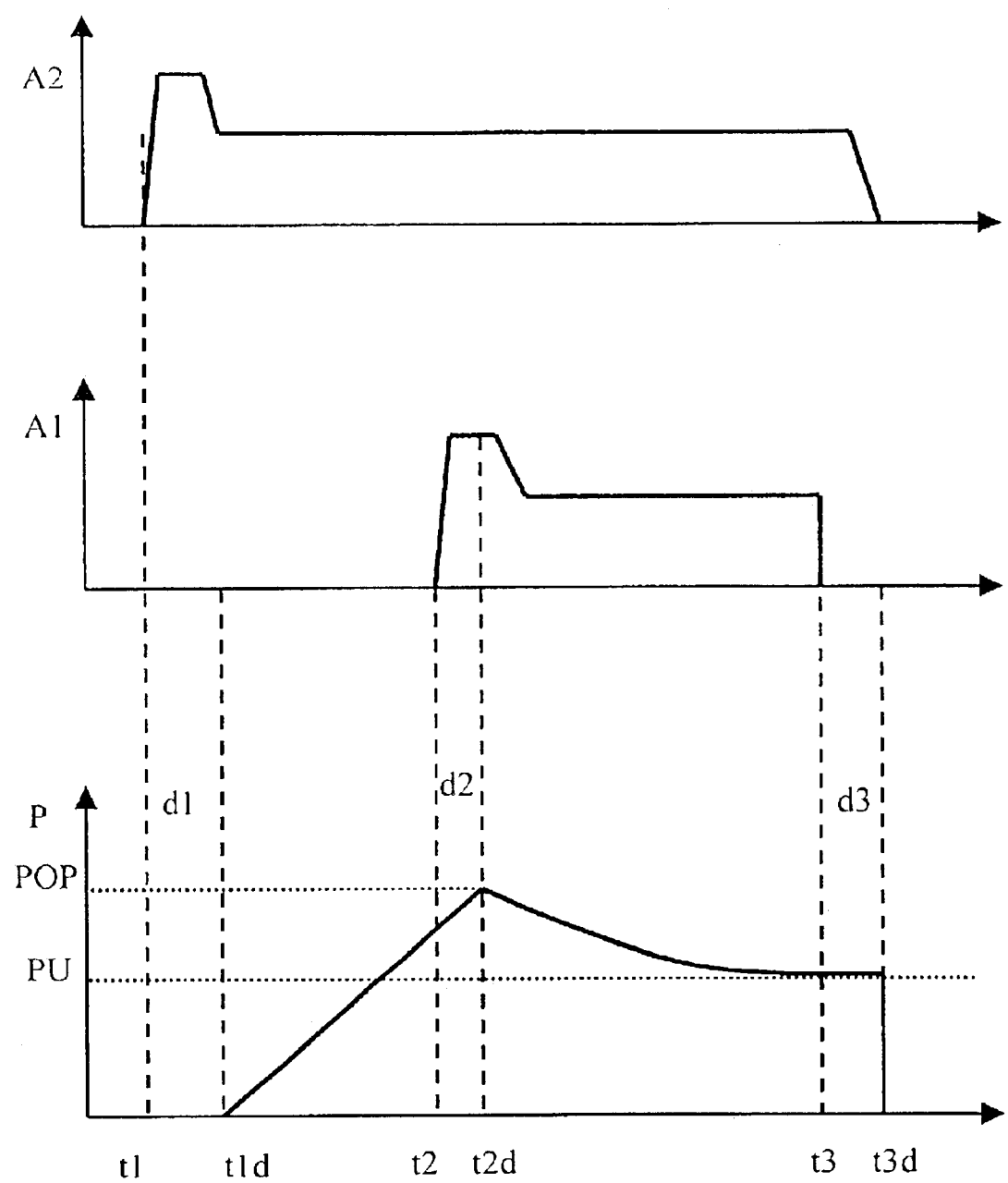
FIG. 2 shows different variables plotted against time.

FIG. 2 shows the different phases over time t and trigger signals A1 and A2 present for the final controlling elements, as well as pressure P. Triggering of the second final controlling element begins at time t1. At time t1d, which follows time t1 essentially by switching time d1 of the second final controlling element, the second final controlling element assumes a position in which pressure buildup is possible. The pressure buildup phase begins at time t1d.

At time t2, triggering of the first final controlling element begins; at time t2d, which follows time t2 essentially by switching time d2 of the first final controlling element, the pressure buildup phase ends and the injection phase begins. At time t3, triggering of the first final controlling element ends, and at time t3d, which follows time t3 essentially by switching time d3 of the first final controlling element, fuel metering ends.

The pressure buildup phase begins at time t1d and ends at time t2d. During the pressure buildup phase, pressure in the pump builds up as a function of the piston stroke and thus of the angle swept by the camshaft independently of the rotation speed. The following formula applies for the variation of pressure P over time:

$$P(t) = C_1 * \int_{w(t1d)}^{w(t2d)} C1000(w) * dw$$

Quantity C1 is a constant. Variable C1000 describes the shape of the cam profile, i.e., the shape of the cam which drives the pump. Variable w(t) is the angular position of the camshaft.

Transition to the injection phase takes place within a time period d2, which depends on the pump pressure, after time t2. Time d2 is independent of the rotational speed. The following equation applies:

d2=F(POP), where F is a known function and POP is the fuel pressure at time t2d, i.e., at the start of injection.

The injection phase ends at time t3d. During the injection phase, additional fuel is pumped by the piston as a function of the rotational speed, while fuel is injected through the nozzle as a function of the pressure. Pressure P varies during the injection phase almost exactly according to the following exponential function:

$$P(t) = PU + (POP - PU) * \exp\frac{-t}{\tau}$$

At the end of an (infinitely) long injection, pump pressure PU is established, which only depends on the rotational speed, but not on pressure POP at the start of injection. Therefore, the pressure may increase or decrease during injection. The end of the injection phase at time t3d follows time t3, when the first final controlling element is de-energized, by a constant time period d3.

According to the present invention, variables which characterize the start t1d of pressure buildup, the start t2d of fuel metering and/or the end t3d of fuel metering are defined on the basis of first and second trigger signals A1 and A2. Pressure PU is defined by using the rotational speed and used for determining the variation of pressure P.

On the basis of these variables and the formulas given, the variation of pressure P over time and, by integration of the variation over time from time t2d to time t3d, the amount of fuel injected are determined according to the present invention. For this purpose, it is assumed that injected amount of fuel QK follows the law of turbulent flow with a good approximation. Therefore, the following equation is used:

$$QK = C * \int_{t2d}^{t3d} \sqrt{P(t)dt}$$

The above-described method for determining the variation of pressure may be implemented in different ways. Thus, the method may be used as a calibration aid and/or as a pressure estimator.

When the model is used as a pressure estimator, the pressure and the injected amount of fuel are continuously computed in the controller. This pressure signal thus obtained and/or the fuel amount signal is then used for malfunction monitoring and/or control of the injection.

Pressure POP at the start of injection is preferably used for determining the duration of triggering via the pump characteristics map. This means that the trigger signal for first final controlling element 105, in particular the duration of triggering, is read from the pump characteristics map on the basis of rotational speed N, injected amount of fuel QK, and pressure POP at the start of injection.

In particular, it may be provided that a malfunction is detected when the pressure exceeds a maximum pressure or when the injected amount exceeds a maximum amount. A malfunction is preferably detected when the amount computed using the model deviates considerably, i.e., by an amount greater than a threshold value, from the desired amount of fuel, which is defined as a function of the driver's intent in particular. It is particularly advantageous if individual variables of the model, such as fuel pressure POP at the start of injection, are determined and used for generating the trigger signals.

The computed amount of fuel and/or the computed pressure are compared with the predefined values according to the present invention; a malfunction is detected on the basis of the comparison. In particular, the computed amount of fuel is compared with a desired amount of fuel.

Furthermore, the model may be used as a calibration aid. In these systems, the injected amount is essentially a function of pressure at the start of injection, in addition to the duration of injection. The calibrator therefore selects two parameters for a given rotational speed and fuel temperature in order to set the desired amount.

Preferably only a few pressure curves and injected amounts are measured during calibration using samples of the injection systems. The constants and functions of the individual variables are determined from these few measured values. The pressure curves and/or the injected amounts are then computed at the remaining and/or all operating points on the basis of the trigger signals using the variables thus determined. Thus considerably fewer resources are required during calibration. Instead of all operating points, only a few operating points, approximately 10 to 50, are measured.

The formulas on which the model is based are invertible. This allows the calibrator to predefine the injection operation, i.e., amount, start of injection and fuel pressure at start of injection. The injection sequence is then calculated therefrom.

During calibration, the amount of injected fuel is measured according to the present invention at different operating points and the constants and functions are determined from the measured values. The values of fuel amount are determined for the remaining operating points and/or all operating points on the basis of the determined constants and functions.

What is claimed is:

1. A method of determining at least one of a fuel pressure and an injected amount of a fuel, comprising:
   metering the fuel by a fuel injection unit to an internal combustion engine as a function of a first trigger signal and a second trigger signal, the first trigger signal controlling a start and an end of a fuel metering, and the second trigger signal controlling a pressure buildup; and
   determining a variation of pressure on the basis of at least the first trigger signal and the second trigger signal.

2. The method as recited in claim 1, wherein:
   variables corresponding to at least one of a start of the pressure buildup, the start of the fuel metering, and the end of the fuel metering are predefinable on the basis of the first trigger signal and the second trigger signal.

3. The method as recited in claim 2, further comprising:
   determining the variation of pressure on the basis of a rotational speed.

4. The method as recited in claim 1, further comprising:
   determining the injected amount of the fuel on the basis of the variation of pressure.

5. The method as recited in claim 1, further comprising: calibrating by:
   measuring an amount of the fuel at various operating points, and
   determining on the basis of measured values constants and functions for determining the variation of pressure.

6. The method as recited in claim 5, further comprising:
   determining fuel amount values for remaining operating points on the basis of the determined constants and functions.

7. The method as recited in claim 1, further comprising:
   performing a first comparison of at least one of a computed amount of fuel and a computed pressure with predefined values; and
   detecting a malfunction on the basis of the first comparison.

8. The method as recited in claim 7, further comprising:
   performing a second comparison of the computed amount of fuel with a desired amount of fuel; and
   detecting the malfunction on the basis of the second comparison.

9. A device for determining at least one of a fuel pressure and an injected amount of a fuel, comprising:
   a fuel injection unit for metering the fuel to an internal combustion engine as a function of a first trigger signal and a second trigger signal, the first trigger signal controlling a start and an end of a fuel metering, and the second trigger signal controlling a pressure buildup; and
   an arrangement for determining a variation of pressure on the basis of at least the first trigger signal and the second trigger signal.

10. A computer program including a program code that when executed on a computer results in a performance of:
    metering a fuel by a fuel injection unit to an internal combustion engine as a function of a first trigger signal and a second trigger signal, the first trigger signal controlling a start and an end of a fuel metering, and the second trigger signal controlling a pressure buildup; and
    determining a variation of pressure on the basis of at least the first trigger signal and the second trigger signal.

11. A computer-readable data medium including a program code that when executed on a computer results in a performance of:
    metering a fuel by a fuel injection unit to an internal combustion engine as a function of a first trigger signal and a second trigger signal, the first trigger signal controlling a start and an end of a fuel metering, and the second trigger signal controlling a pressure buildup; and
    determining a variation of pressure on the basis of at least the first trigger signal and the second trigger signal.

12. The computer-readable data medium as recited in claim 11, wherein:
    the computer-readable data medium includes a floppy disk.

* * * * *